(12) United States Patent
Lomnitz

(10) Patent No.: US 8,458,548 B2
(45) Date of Patent: Jun. 4, 2013

(54) ADAPTIVE H-ARQ USING OUTAGE CAPACITY OPTIMIZATION

(75) Inventor: Yuval Lomnitz, Herzelia (IL)

(73) Assignee: Intel Corporation, Santa Clara, CA (US)

(*) Notice: Subject to any disclaimer, the term of this patent is extended or adjusted under 35 U.S.C. 154(b) by 360 days.

(21) Appl. No.: 12/644,149

(22) Filed: Dec. 22, 2009

(65) Prior Publication Data

US 2011/0154145 A1 Jun. 23, 2011

(51) Int. Cl.
*G08C 25/02* (2006.01)

(52) U.S. Cl.
USPC .......................... 714/748; 714/750

(58) Field of Classification Search
USPC .................................. 714/748, 750
See application file for complete search history.

(56) References Cited

U.S. PATENT DOCUMENTS

| | | | |
|---|---|---|---|
| 6,631,127 B1* | 10/2003 | Ahmed et al. | 370/349 |
| 7,310,499 B2* | 12/2007 | Magnusson et al. | 455/69 |
| 2002/0085503 A1* | 7/2002 | Hulyalkar et al. | 370/252 |
| 2004/0010744 A1* | 1/2004 | Chen et al. | 714/755 |
| 2008/0256411 A1* | 10/2008 | Whinnett et al. | 714/750 |
| 2008/0282125 A1* | 11/2008 | Hafeez et al. | 714/748 |
| 2008/0310400 A1* | 12/2008 | Cai et al. | 370/352 |
| 2009/0031183 A1* | 1/2009 | Hoshino et al. | 714/748 |
| 2009/0070650 A1* | 3/2009 | Bourlas et al. | 714/748 |
| 2009/0249158 A1* | 10/2009 | Noh et al. | 714/750 |
| 2010/0058132 A1* | 3/2010 | Kumar | 714/748 |

FOREIGN PATENT DOCUMENTS

| | | |
|---|---|---|
| EP | 2159930 A1 | 3/2011 |
| JP | 2003-264873 A | 9/2003 |
| JP | 2004-112800 A | 4/2004 |
| JP | 2005-528058 A | 9/2005 |
| JP | 2005-536926 A | 12/2005 |
| WO | 2004/017557 A1 | 2/2004 |
| WO | 2007/053616 A2 | 5/2007 |
| WO | 2008/152766 A1 | 12/2008 |

OTHER PUBLICATIONS

GB1021099.5, United Kingdom Combined Search and Examination Report, mailed on Apr. 1, 2011, 6 pages.
Gopalakrishnan et al., "Achievable Rates for Adaptive IR Hybrid ARQ", Sarnoff Symposium, 2008 IEEE, Apr. 2008, 7 pages.
Gopalakrishnan et al., "Rate Selection Algorithms for IR Hybrid ARQ", Sarnoff Symposium, 2008 IEEE, Apr. 2008, 7 pages.
Office Action Received for Japanese Patent Application No. 2010-261187, Mailed on Jun. 26, 2012, 3 pages of Office Action and 3 Pages of English Translation.

* cited by examiner

*Primary Examiner* — Yolanda L Wilson
(74) *Attorney, Agent, or Firm* — Cool Patent, P.C.; Kenneth J. Cool; Joseph P. Curtin

(57) ABSTRACT

Briefly, in accordance with one or more embodiments, a data packet comprising a first number of bits encoded over a first number of symbols is transmitted to a receiver. If the receiver did not successfully decode the data packet, a negative acknowledgment message is received along with metric information for the transmission. The data packet encoded with a varying number of symbols and transmitted to the receiver, wherein the varying number of symbols is a function of the metric information for the first transmission.

18 Claims, 8 Drawing Sheets

ADAPTIVE H-ARQ USING OUTAGE CAPACITY OPTIMIZATION

BACKGROUND

In wireless communication systems, Hybrid-Automatic Repeat Request (H-ARQ) may be utilized as a retransmission protocol to ensure accurate transmissions between a transmitter and a receiver, and to repeat transmissions that were unsuccessful or which contain errors in the transmitted data. Using H-ARQ, information received from a previous unsuccessful transmission of a packet is combined with the retransmitted data when that packet is retransmitted. The combined data packet is then attempted to be decoded by the receiver. In one version of H-ARQ, the same amount of information is retransmitted at each iteration until the receiver announces successful decoding of the packet, or until a maximum number of retransmissions is reached.

A variation of a H-ARQ process may be referred to as adaptive H-ARQ in which additional information from the receiver is fed back when the receiver reports to the transmitter of a packet failure. The receiver reports a packet failure via a negative acknowledgment (NACK) message. When the transmitter receives a NACK. message from the receiver, the retransmission parameters may be adjusted based on the additional information received along with the NACK message. Typically, such additional information comprises signal-to-noise ratio (SNR) information which is fed back to from the receiver to the transmitter. The transmitter then adjusts the retransmission parameters based on the SNR information of the previous transmission in an attempt to increase the likelihood that the retransmission of the packet will be more successful than the previous transmission attempt. In orthogonal frequency-division multiplexing (OFDM) systems, however, the SNR information may not be a sufficient indicator of the performance of the wireless system.

DESCRIPTION OF THE DRAWING FIGURES

Claimed subject matter is particularly pointed out and distinctly claimed in the concluding portion of the specification. Such subject matter may however, be understood by reference to the Wowing detailed description when read with the accompanying drawings in which:

Figure 1:
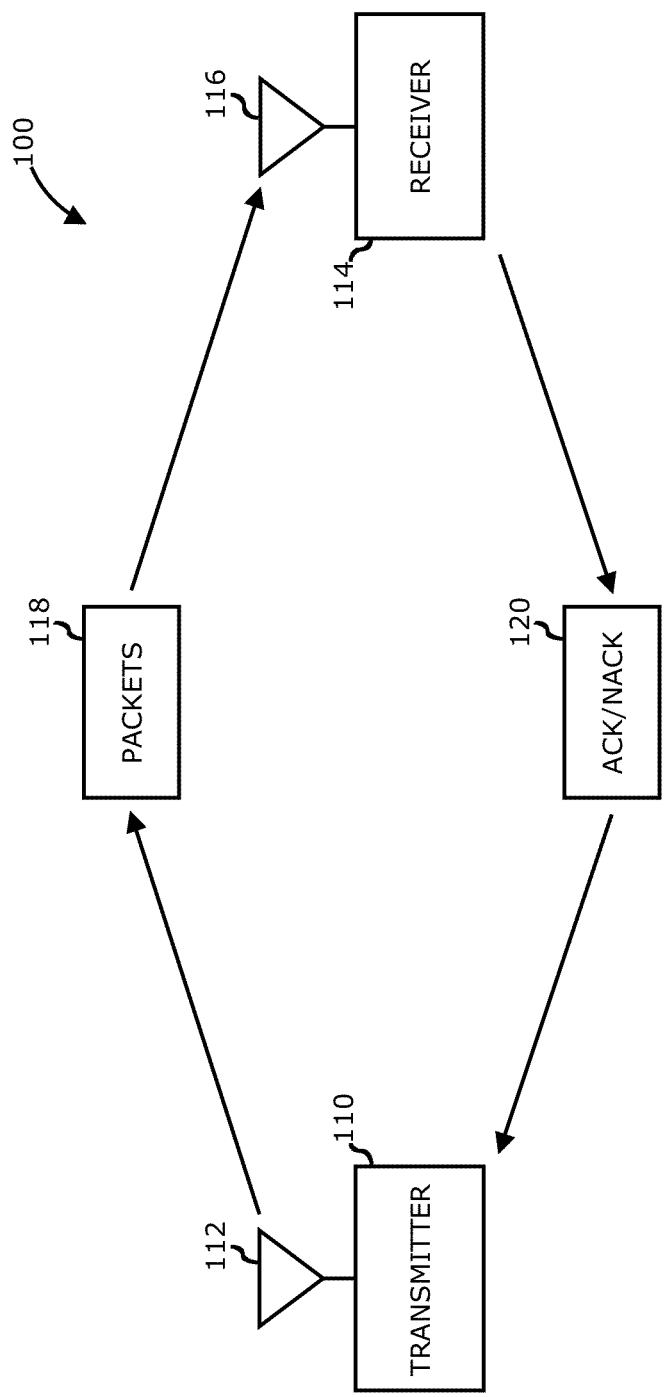
FIG. 1 is a block diagram of an adaptive H-ARQ system using outage capacity optimization in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Couple may, however, also mean that two or more elements may not be in direct contact with each other, but yet may still cooperate and/or interact with each other. For example, "coupled" may mean that two or more elements do not contact each other, but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over" may, however, also mean that two or more elements are not in direct contact with each other. For example, "over" may mean that one element is above another element, but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of an adaptive H-ARQ system using outage capacity optimization in accordance with one or more embodiments will be discussed. As shown in FIG. 1, adaptive H-ARQ system 100 may comprise one or more transmitters 110 and one or more receivers 114. Transmitter 110 may include one or more antennas 112, for example, to implement a single-input, single-output (SISO) or a multiple-input, multiple-output (MIMO) system. Likewise, receiver 114 may include one or more antennas 116 to implement a SISO or a MIMO system, Other types of antenna systems may likewise be implemented, such as single-input, multiple-output (SIMO) or multiple-input, single-output (MISO). The scope of the claimed subject matter is, however, not limited in this respect. In one or more embodiments, transmitter 110 transmits one or more packets 118 to receiver 114. When a packet is received by transmitter 114, or attempted to be received, receiver 114 sends a reply message 120 back to transmitter 110 in a feedback loop to indicate to transmitter 110 whether or not the transmitted packet 118 was successfully received and decoded by receiver 114. If the transmission of the packet 118 was successful, receiver 114 feeds back an acknowledgement (ACK) message as the reply message 120 to transmitter 110 in which case transmitter 110 may then transmit the next packet 118 to receiver 114. If however, transmission of the packet 118 was not successful, receiver 114 feeds back a negative acknowledgement (NACK) message as the reply 120 to transmitter 110. Upon receipt of a NACK message as the reply message 120, transmitter 110 may retransmit the same packet 118 that failed an additional one or more times. The packet 118 may be retransmitted an additional number of iterations until receiver 114 is able to successfully receive and decode the retransmitted packet 118, or until a maximum number of allowed retransmissions is reached. If transmitter 114 is able to successfully receive and decode the retransmitted packet 118, receiver 114 may then feedback an ACK message as the reply message 120 to transmitter 110 at which time transmitter 110 may then continue to transmit one or more new packets 118. If the maximum number of retransmissions is reached without being successfully decoded by receiver 114, retransmissions may be terminated.

In accordance with one or more embodiments, the reply message 120 may include information fed back to transmitter 110 by receiver 114 in addition to a NACK message. The transmitter 110 may use the fed back information to adjust transmission parameters for the next one or more retransmissions of the failed packet 118. The additional information is related to the previous transmission of the packet 118 and why the previous transmission failed so that transmitter 110 may correct for, or adapt to, the conditions that caused the failure so that the next transmission may have a greater likelihood of being successfully received and decoded. In accordance with one or more embodiments, the additional information may comprise the channel capacity of one or more previous transmissions. Transmitter 110 may then set the capacity as a function of the number of symbols to transmit packet 118 in one or more retransmissions of packet 118 to optimize throughput of the retransmissions. In one or more embodiments, the throughput may be measured by a target outage value. For example, for a single-input, single-output (SISO) antenna system, a target outage value may be selected to be about 1%, meaning 1% of the transmitted packets 118 may fail, while 99% of the transmitted packets 118 may be successful. This, however, is merely one example target outage parameter value, and other target outage values likewise may be utilized. Furthermore, other types of antenna systems, such as multiple-input, multiple output (MIMO) antenna systems, may involve a corresponding target outage value, and the scope of the claimed subject matter is not limited in this respect. In addition, the target outage value may represent an average value over time, and the scope of the claimed subject matter is not limited in this respect. An example wireless wide area network (WWAN) using adaptive H-ARQ system 100 of FIG. 1 is shown in and described with respect to FIG. 2, below.

Figure 2:
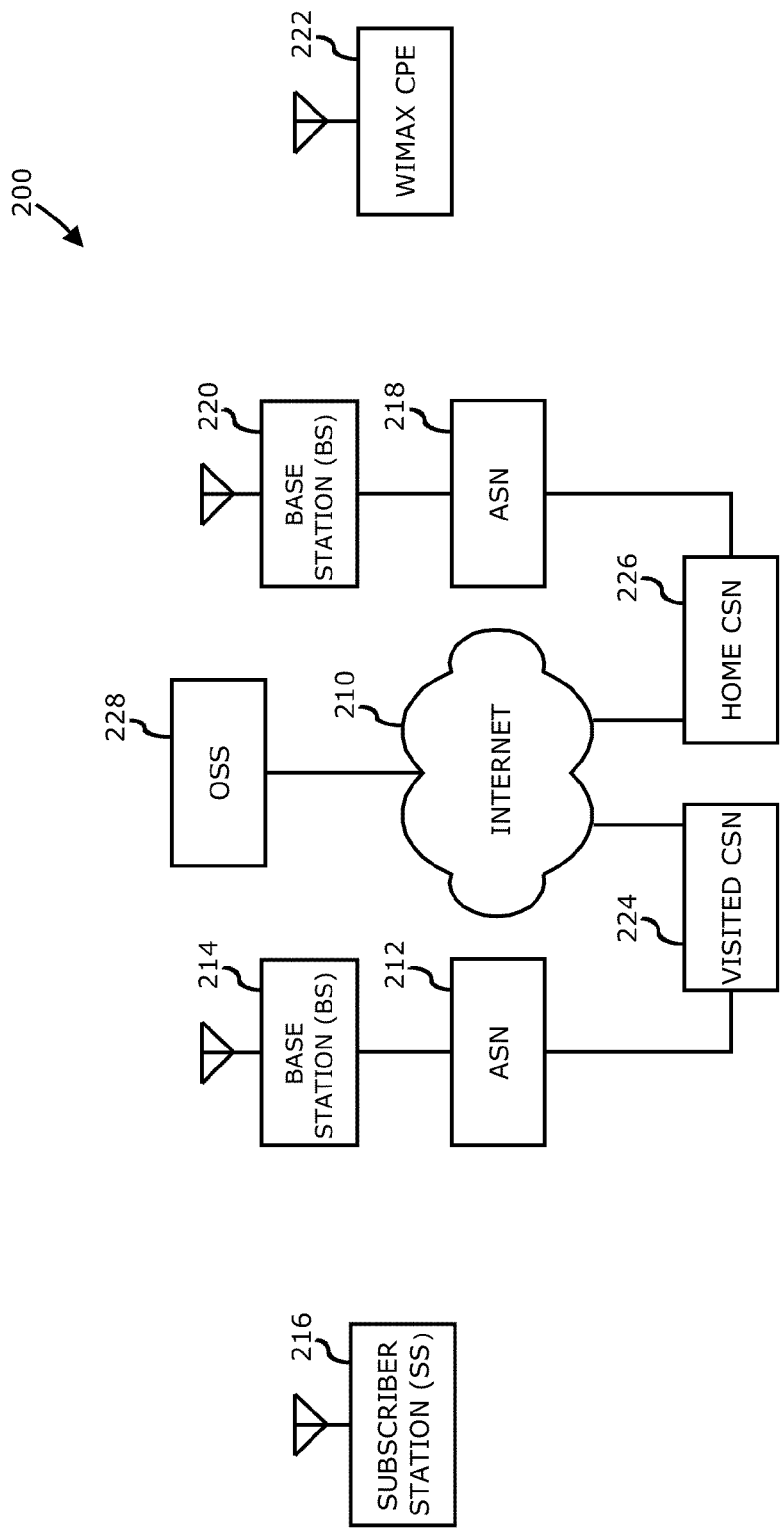
FIG. 2 is a block diagram of a wireless wide area network capable of implementing adaptive H-ARQ using outage capacity optimization in accordance with one or more embodiments.

Referring now to FIG. 2, a block diagram of a wireless wide area network capable of implementing adaptive H-ARQ using outage capacity optimization in accordance with one or more embodiments will be discussed. As shown in FIG. 2, network 200 may be an Internet Protocol (IP) type network comprising an Internet-type network 210 or the like that is capable of supporting mobile wireless access and/or fixed wireless access to Internet 10. In one or more embodiments, network 200 may be in compliance with a Worldwide Interoperability for Microwave Access (WiMAX) standard or future generations of WiMAX, and in one particular embodiment may be in compliance with an Institute for Electrical and Electronics Engineers 802.16m stnndard (IEEE 802.16m). In one or more alternative embodiments network 200 may be in compliance with a Third Generation Partnership Project Long Term Evolution (3GPP LTE) or a 3GPP2 Air Interface Evolution (3GPP2 AIE) standard, and/or subsequent generation cellular networks such as a Fourth Generation (4G) network or the like. In general, network 100 may comprise any type of orthogonal frequency division multiple access (OFDMA) based wireless network, and the scope of the claimed subject matter is not limited in these respects. As an example of mobile wireless access, access service network (ASN) 212 is capable of coupling with base station (BS) 214 to provide wireless communication between a mobile subscriber station (SS) 216 and internet 210. Subscriber station 216 may comprise a mobilet type device or information-handling system capable of wirelessly communicating via network 200, for example, a notebook-type computer, netbook, a cellular telephone, a personal digital assistant, or the like. ASN 212 may implement profiles that are capable of defining the mapping of network functions to one or more physical entities on network 200. Base station 214 may comprise radio equipment to provide radio-frequency (RF) communication with subscriber station 216, and may comprise, for example, the physical layer (PHY) and media access control (MAC) layer equipment in compliance with an IEEE 802.16m standard. Base station 214 may further comprise an IP backplane to couple to Internet 210 via ASN 212, although the scope of the claimed subject matter is not limited in these respects.

Network 200 may further comprise a visited connectivity service network (CSN) 224 capable of providing one or more network functions including, but not limited to proxy- and/or relay-type functions, for example, authentication, authorization and accounting (AAA) functions, dynamic host configuration protocol (DHCP) functions, or domain name service controls or the like, domain gateways such as public switched telephone network (PSTN) gateways or Voice Over Internet Protocol (VOIP) gateways, and/or Internet Protocol (IP) type server functions, or the like. These are, however, merely example of the types of functions that are capable of being provided by visited CSN or home CSN 226, and the scope of the claimed subject matter is not limited in these respects. Visited CSN 224 may be referred to as a visited CSN in the case, for example, in which visited CSN 224 is not part of the regular service provider of subscriber station 216, for example, in which subscriber station 216 is roaming away from its home CSN, such as home CSN 226, or for example, in which network 200 is part of the regular service provider of subscriber station, but in which network 200 may be in another location or state that is not the main or home location of subscriber station 216. In a fixed wireless arrangement. WiMAX-type customer premises equipment (CPE) 222 may be located in a home or business to provide home or business customer broadband access to Internet 210 via base station 220, ASN 218, and home CSN 226 in a manner similar to access by subscriber station 216 via base station 214. ASN 212, and visited CSN 224, a difference being that WiMAX CPE 222 is generally disposed in a stationary location, although it may be moved to different locations as needed, whereas subscriber station 216 may be utilized at one or more locations if subscriber station 216 is within range of base station 214, for example. In accordance with one or more embodiments, operation support system (OSS) 228 may be part of network 200 to provide management functions for network 200 and to provide interfaces between functional entities of network 200. Network 200 of FIG. 2 is merely one type of wireless network showing a certain number of the components of network 200; however, the scope of the claimed subject matter is not limited in this respect. A flow diagram of the operation of an adaptive H-ARQ process is shown in and described with respect to FIG. 3, below.

Figure 3:
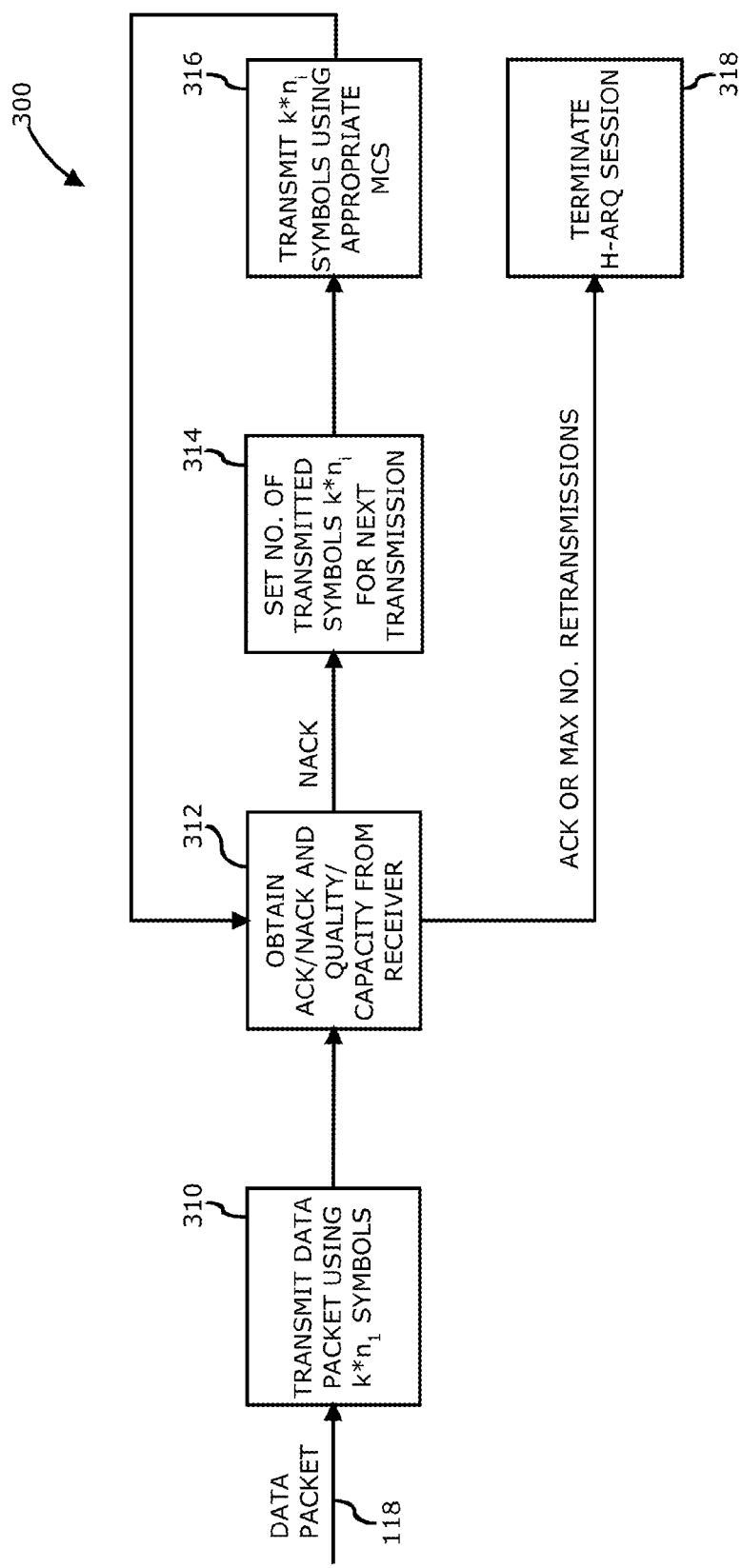
FIG. 3 is a flow diagram of an adaptive H-ARQ process using outage capacity optimization in accordance with one or more embodiments.

Referring now to FIG. 3, a flow diagram of an adaptive H-ARQ process using outage capacity optimization in accordance with one or more embodiments will be discussed. The flow diagram. of the adaptive H-ARQ process 300 of FIG. 3 may be implemented by the adaptive H-ARQ system 100 as shown in FIG. 1. At block 310, a data packet 118 may be transmitted by transmitter 110 with k bits encoded over $k \cdot n_1$ symbols in which $n_i$ may be a value determined by the result of an optimization process as discussed herein. The index, i, may refer the transmission number such that i=1 refers to the first transmission, i=2 refers to the second transmission, and so on. A transmission having an index of i=2 or greater may be referred to as a retransmission, although transmission generically may refer to any value of the index, i, or the $i^{th}$ transmission, and the scope of the claimed subject matter is not limited in this respect. The modulation may be determined so that the code rate, R, may be expressed as:

$$R = 1/(n_1 \cdot N_{bps})$$

which $N_{bps}$ is the number of bits per symbol of the modulation. The code rate, R. is selected to be within predetermined limits based at least in part on the modulation. The receiver 114 then receives the packet 118 and attempts to decode the data in the packet 118 and determines the capacity. If the receiver 114 is capable of capable of decoding the packet 118, then the receiver 114 sends an ACK message to transmitter HO at block 312, and the adaptive H-ARQ process 300 terminates at block 318. Likewise, if the maximum. number of retransmissions is reached process 300 terminates at block 318.

Otherwise, if the maximum number of transmissions has not been reached, the receiver 114 is not capable of decoding the packet 118, the receiver 114 sends a NACK message to the transmitter 110 at block 312 along with the quality capacity information from the first attempted transmission of packet 118. In one or more embodiments, the capacity information may be represented as C and may be the capacity or the aggregated capacity over one or more previous retransmissions.

In one or more embodiments, the term capacity as utilized herein may refer to the Shannon capacity of the channel, however, the scope of the claimed subject matter is not limited in this respect. in one or more embodiments, the term capacity may in general may refer to one or more metrics utilized to measure channel quality, and some embodiments may refer to metrics that measure the maximum transmission rate over a channel, for example, mutual information, and/or approximations thereof, and the scope of the claimed subject matter is not limited in these respects.

For the next transmission, i, wherein i=2 . . . up to the maximum number of retransmissions, at block 314 the transmitter 110 computes and sets the number of symbols $n_i(C)$ as a function of the previously obtained capacity for retransmission, and the packet 118 is transmitted with $k \cdot n_i$, symbols at block 316 using an appropriate modulation and coding scheme (MCS). In the event the packet is not successfully received and decoded by receiver 114, blocks 312, 314, and 316 are repeated until the packet 118 is successfully received and decoded, or until the maximum number of retransmissions is reached. The optimization described herein, below, finds the functions $n_i(C)$ that optimize the spectral efficiency.

In one or more embodiments, the outage capacity may be utilized to optimize adaptive H-DRQ process 300. In such embodiments, a target outage capacity for a SISO system may be a target outage value of about 1% meaning about 1% of the data packets are not successfully received or decoded by receiver 114, The outage capacity value may be optimized by feeding back the channel capacity from one or more previous transmissions of a packet wherein the transmitter 110 may adjust the transmission parameters for one or more retransmissions of that packet, for example, by selecting the number of symbols in the retransmissions. In one or more embodiments, the number of symbols in one or more retransmissions may be determined at least in part by a heuristic algorithm to optimize the target outage value to be at a selected value, for example, the 1% target value for SISO systems. For example, the sum capacity of one or more previous transmissions may be fed back from receiver 114 to transmitter 110 wherein transmitter 110 sets the length of one or more retransmissions as a decreasing function of the fed back capacity. The capacity that is fed back may be determined by various methods, such as capacity per retransmission, sum capacity of one or more previous transmissions, or residual capacity involved in decoding of the packet 118. Other quality information may be utilized in addition to the capacity, For example, as an approximation a sum of the capacity may be fed back as follows:

$$\Sigma C = \log(1 + SNR)$$

in which SNR is the signal-to-noise ratio (SNR) estimated by receiver 114 and weighted by the number of symbols in one or more retransmissions. In one or more embodiments, the retransmission length may be set as a decreasing function of the aggregated capacity from one or more previous transmissions, for example, a decreasing linear function such as:

$$n_i = a_i \cdot \left[ k - \sum_{j<i} n_j C_j \right]^+.$$

In one or more embodiments, a retransmission may be aborted in the event the aggregated capacity is below a predetermined threshold in order not to waste transmissions that are likely to be unsuccessful. Such an aborting of retransmissions below a predetermined threshold may be referred to as a water pouring effect. In one or more embodiments, a selective ACK scheme may be implemented with adaptive H-ARQ method 300. In such a selective ACK. scheme, combining may be performed based on whether or not an ACK is sent. Such a selective ACK scheme may be implemented to accommodate cases wherein the length of a retransmission is equal to a length of a previous transmission, and/or in which the probability of a failure in the first or previous transmission is 1or nearly 1. It may, however, still be beneficial to implement several transmissions in order to obtain time diversity regardless of whether an ACK/NACK message is fed back. In one or more alternative embodiments, a partially synchronous allocation scheme may be implemented in which a second transmission is synchronous at a fixed location compared to a first transmission, and a third transmission is allocated dynamically. These are howeves, merely example schemes thr implementing an adaptive H-ARQ process 300, and the scope of the claimed subject matter is not limited in these respects.

Figure 4:
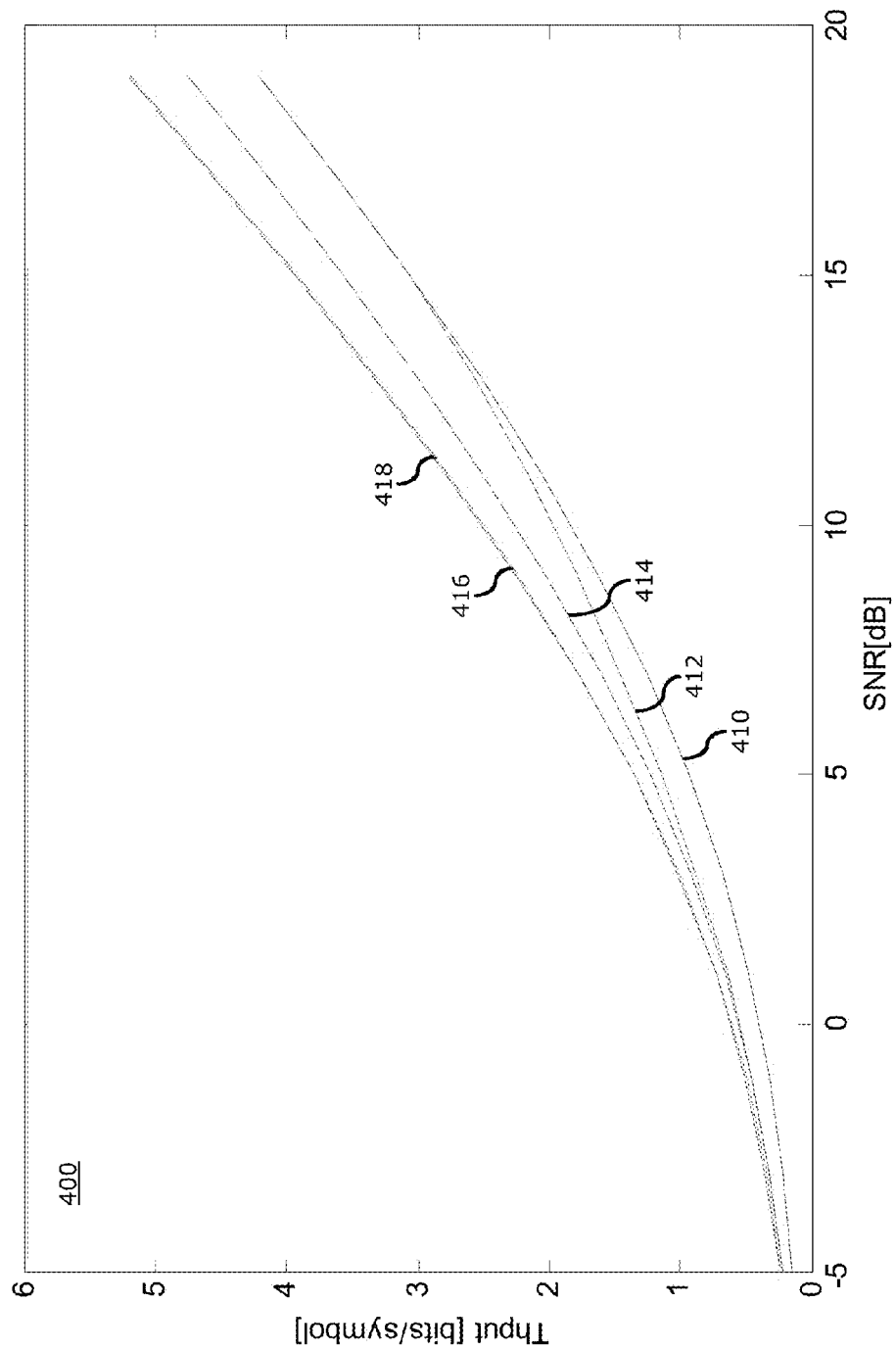
FIG. 4 is a graph illustrating mean throughput of an adaptive H-ARQ system using outage capacity optimization in accordance with one or more embodiments.

Referring now to FIG. 4, a graph illustrating mean throughput of an adaptive H-ARQ system using outage capacity optimization in accordance with one or more embodiments will be discussed. As shown in FIG. 4, graph 400 contains plots of the mean throughput of adaptive H-ARQ system 100 represented in bits per symbol versus signal-to-noise ratio (SNR) in decibels (dB). Plot 410 represents a system 100 in which no feedback is utilized. Overall, this scheme results in the lowest throughput values. Next, plot 412 represents a scheme of an H-ARQ system 100 in which ACK and NACK messages are fed back from receiver 114 to transmitter 110, and the lengths of retransmission are equal to the lengths of the first transmission. This scheme results in slightly better throughput than the no feedback scheme. Next, plot 414 represents a scheme of H-ARQ system 100 in which ACK and NACK messages are fed back, the lengths of the retransmissions are optimized. This scheme results in better throughput than using fixed. length retransmissions. All the schemes described above are non-adaptive. Next, plot 416 represents a scheme of adaptive H-ARQ system 100 in which ACK and NACK messages are fed back, and the number of symbols in the retransmissions is a function of the capacity of the previous transmissions. As shown in FIG. 4, plot 416 represents a relatively higher throughput than the other schemes. Likewise, plot 418 represents the same scheme as plot 416, however, using an optimization algorithm in which retransmissions that would result in capacity values (values of C) that fall below a threshold. value are aborted. The overall throughput in plot 418 is substantially the same as in plot 418 since the two plots are substantially coincident in graph 400. While graph 400 of FIG. 4 illustrates the throughout in bits per symbols, graph 500 of FIG. 5, as discussed below, illustrates the relative enhancement of the schemes with respect to a typical H-ARQ scheme.

Figure 5:
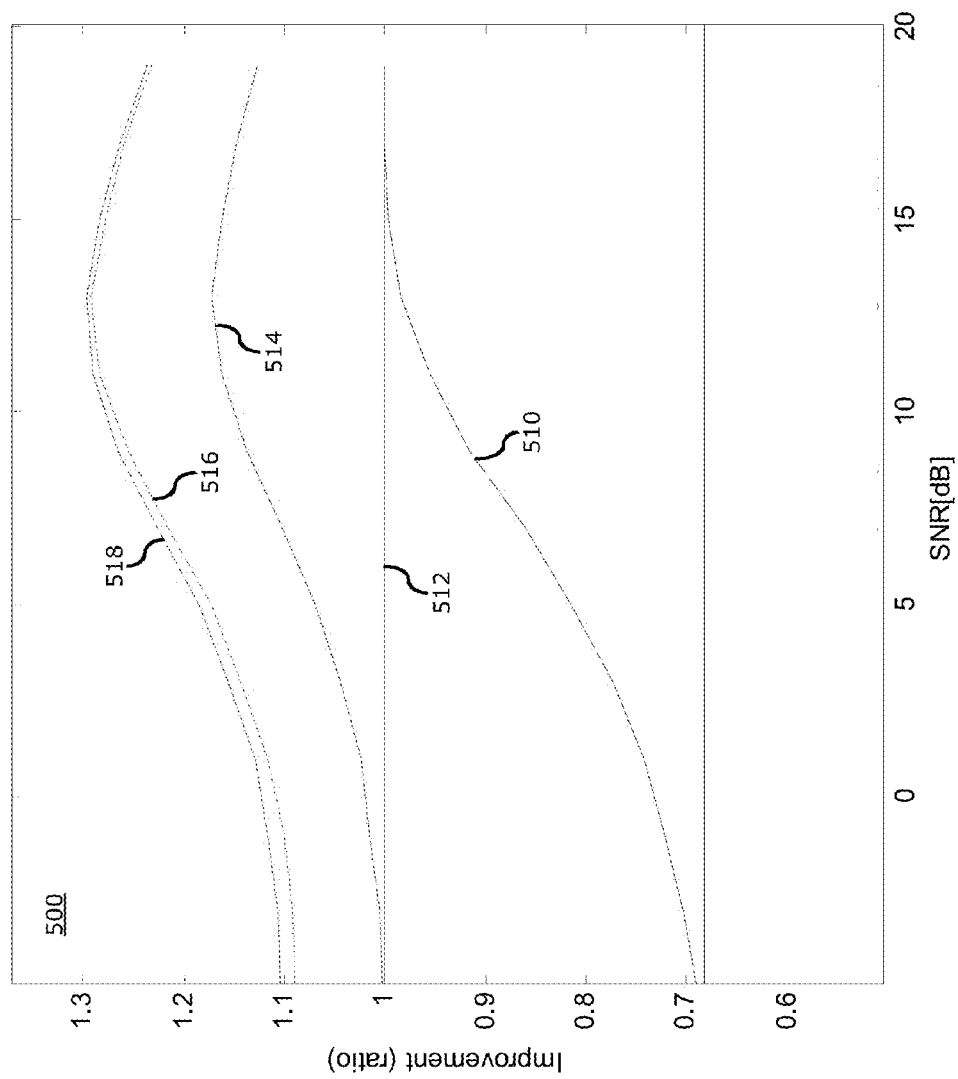
FIG. 5 is a graph illustrating the relative performance improvement of an adaptive H-ARQ system using outage capacity optimization in accordance with one or more embodiments.

Referring now to FIG. 5, a graph illustrating the relative performance improvement of an adaptive H-ARQ system using outage capacity optimization in accordance with one or more embodiments will be discussed. Graph 500 shows the relative enhancement of the schemes with respect to a typical H-ARQ scheme. The plots shown in graph 500 represent the same schemes as the plots shown in graph 400 of FIG. 4, except that relative throughput enhancement is plotted versus SNR in dB as a ratio of the throughput with respect to a typical H-ARQ scheme which is represented by plot 512 and which corresponds to the scheme 412 as shown in FIG, 4. Plot 512 represents an adaptive H-ARQ system 100 in which ACK and NACK messages are fed back and the retransmissions use lengths that are equal to the lengths of the original transmission. Since plot 512 is measured as a ratio with respect to itself, the ratio is always 1 and represented by a horizontal line for all SNR values. Plot 510 represents a scheme in which no feedback is implemented in which case the ratio value is less than or equal to 1, which indicates that not using feedback at plot 510 results in less throughput than using feedback at plot 512. Next, plot 514 represents a scheme in which the lengths of the retransmissions may be variable and optimized. As can be seen, the ratio is equal to or greater than 1, represents an enhancement over a typical H-ARQ scheme represented by plot 512. Next, plot 516 represents a scheme in which the capacity is fed back for adjustment in the transmissions. As can be seen in graph 500, the scheme of plot 516 is always at a ratio greater than 1, which represents a further enhancement with respect to the scheme of plot 514. Likewise, plot 518 represents the scheme of plot 516 with optimization wherein the retransmission is aborted if the capacity that is fed back falls below a threshold value. As can be seen, plot 518 represents a slight enhancement over the scheme of plot 516. It should be noted that the plots of graph 500 of FIG. 5 are merely for purposes of example, wherein other schemes may likewise be implemented to enhance the throughput of adaptive H-ARQ system 100 of FIG. 1, and the scope of the claimed subject matter is not limited in these respects.

Figure 6:
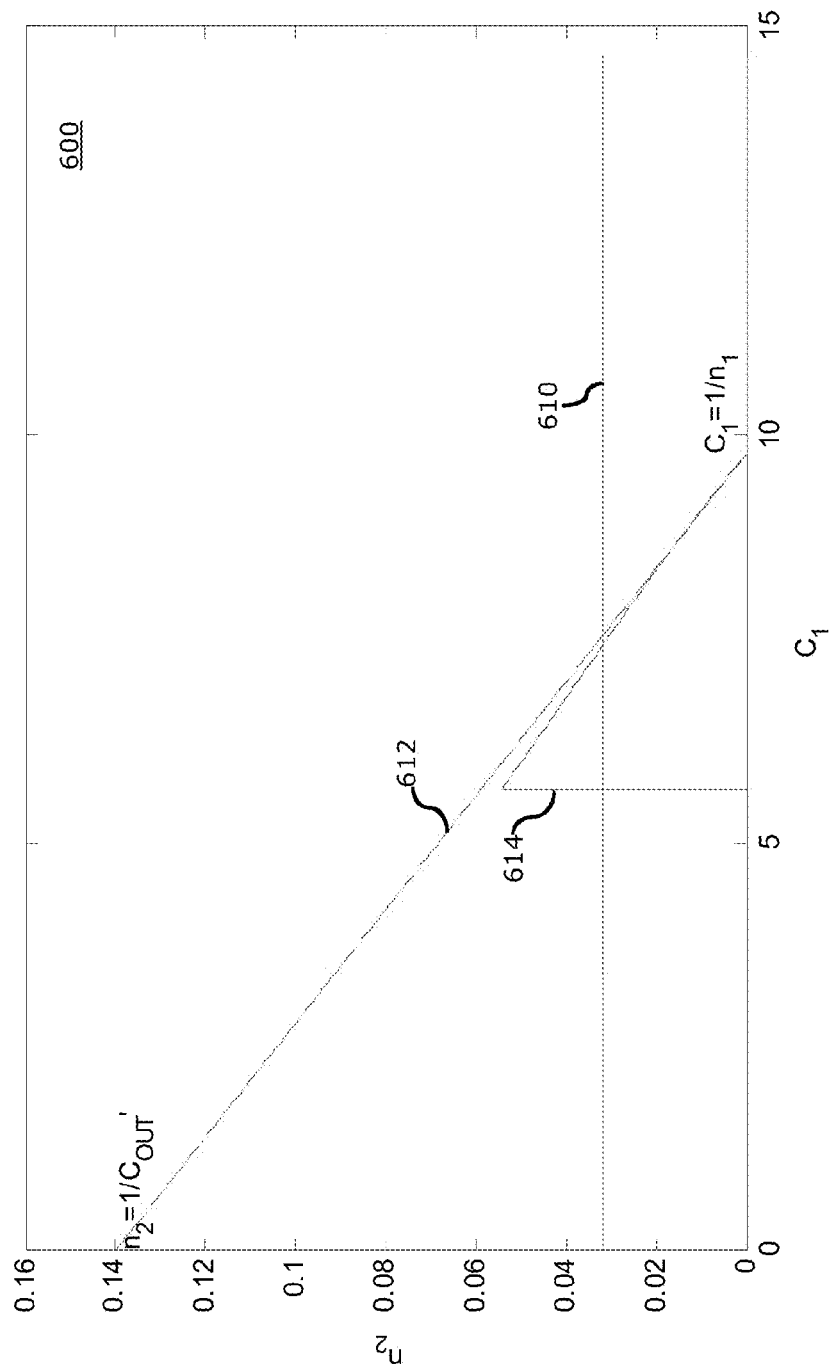
FIG. 6 is a graph illustrating the number of symbols in a retransmission as a function of capacity of a previous transmission of an adaptive H-ARQ system using outage capacity optimization in accordance with one or more embodiments.

Referring now to FIG. 6, a graph illustrating the number of symbols in a retransmission as a function of capacity of a previous transmission of an adaptive H-ARQ system using outage capacity optimization in accordance with one or more embodiments will be discussed. As shown in FIG. 6, graph 600 illustrates plots fbr the value of n for the second transmission as a function of the capacity value, C, that is fed back for the first transmission for various fed back schemes as discussed with respect to FIG. 4 and FIG. 5, above, as an SNR =30 dB. Plot 610 represents a typical H-ARQ scheme in which the retransmissions are all the same length as the first transmission. In such a scheme, the value of $n_2$ remains constant indicating this type of H-ARQ scheme is non-adaptive. Plot 612 represents an adaptive H-ARQ scheme in which the value of $n_2$ is selected such that the number of symbols for the second transmission determined as a function of the capacity in the first transmission such that the rate is equal to the outage capacity. Plot 614 represents the same scheme as the scheme of plot 612, with optimization wherein retransmissions are aborted in which the value of C is less than a threshold value. As shown in graph 600, this threshold value is approximately C=6 such that $n_2$ essentially has a value of zero for values of $C_1$ less than about 6. Such an optimization may be referred to as a water pouring scheme. It should be noted that the values and plots shown in graph 600 are for purposes of example, and the scope of the claimed subject matter is not limited in these respects. An example device and information-handling system such as transmitter 110 or receiver 114 of FIG. 1 capable of implementing an adaptive H-ARQ scheme using an outage capacity optimization is shown in and described with respect to FIG. 7 and FIG. 8, below.

Figure 7:
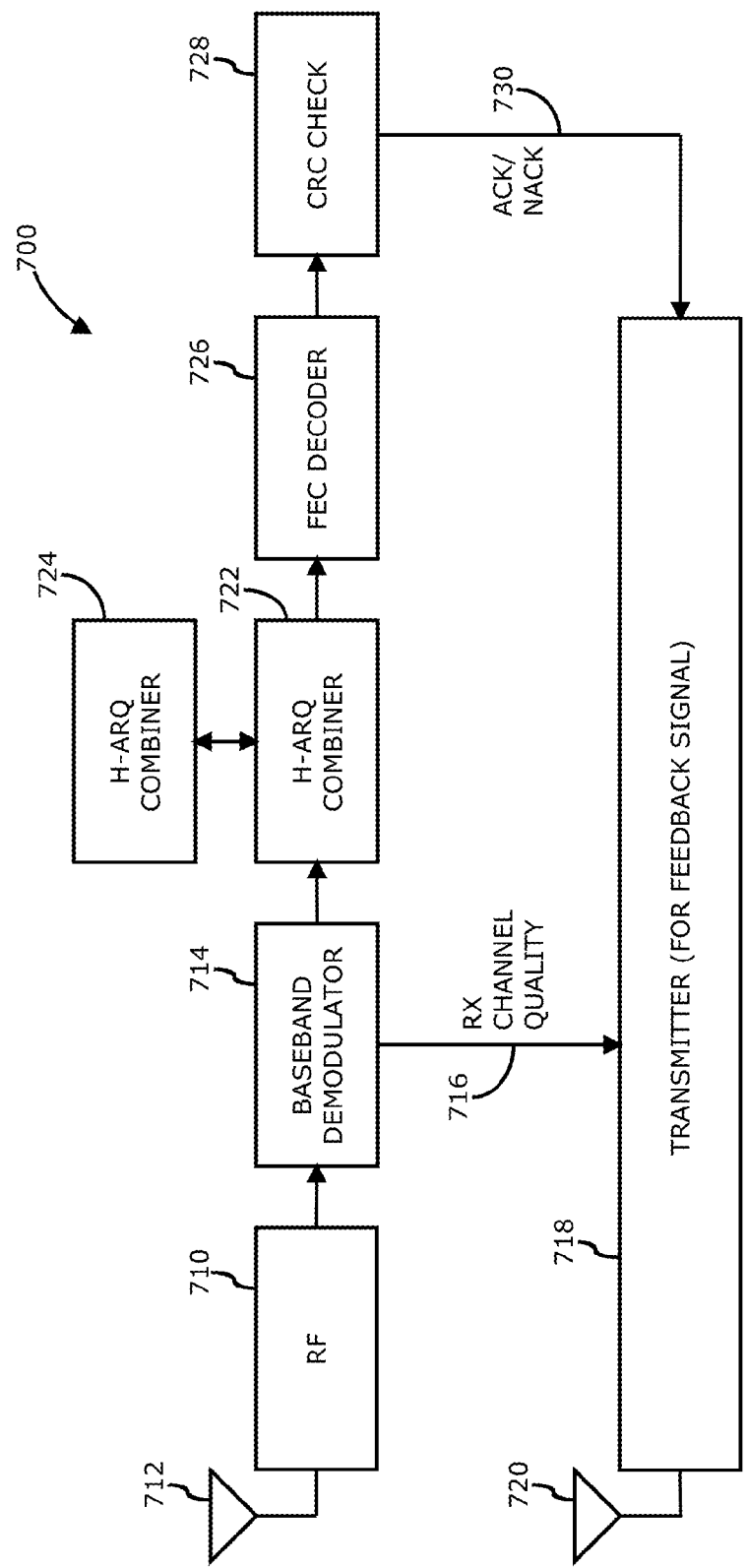
FIG. 7 is a block diagram of an example device capable of implementing an adaptive H-ARQ system using outage capacity optimization in accordance with one or more embodiment.

Referring now to FIG. 7, a block diagram of an example device capable of implementing an adaptive H-ARQ system using outage capacity optimization in accordance with one or more embodiment will be discussed. Device 700 of FIG. 7 may comprise, for example, subscriber station 216 or WiMAX CPE 222 of FIG. 2, among many examples. Device 700 may include a radio-frequency receiver (RF) 710 having one or more antennas 712 coupled to baseband demodulator 714 which demodulates RF signals received by receiver 710 into baseband signals. The receiver channel quality 716 may be obtained from the baseband signals and provided to transmitter 718 which feeds back the channel quality information back to the transmitting device as part of an adaptive H-ARQ process as discussed herein. For example, the transmitting device may comprise base station 214 or base station 220 of FIG. 2, among many examples. Transmitter 718 may be coupled to one or more antennas 720, and in some embodiments may share the same antennas 712 with receiver 710 using appropriate devices such as a diplexer. A H-ARQ combiner 722 may comprise a circuit or a processor coupled to memory 724 in which programming code may be stored for executing an adaptive H-ARQ process as discussed herein. As part of implementing an adaptive H-ARQ process, H-ARQ combiner 722 provides the received baseband signal to a forward error correcting (FEC) decoder 726 which decodes the data in the baseband signal. The decoded data is then processed by a cyclic redundancy check (CRC) circuit 728 which determines if the data has been successfully decoded based on the result of the check. CRC circuit 728 then provides an ACK or NACK reply based on the check to transmitter to feed back the reply to the original transmitting device as part of the adaptive H-ARQ process. It should be noted that FIG. 7 shows merely one example architecture of a device capable of implementing an adaptive H-ARQ process, and in one or more embodiments the device may include more or fewer blocks than shown in various arrangements, and the scope of the claimed subject matter is not limited in this respect.

Figure 8:
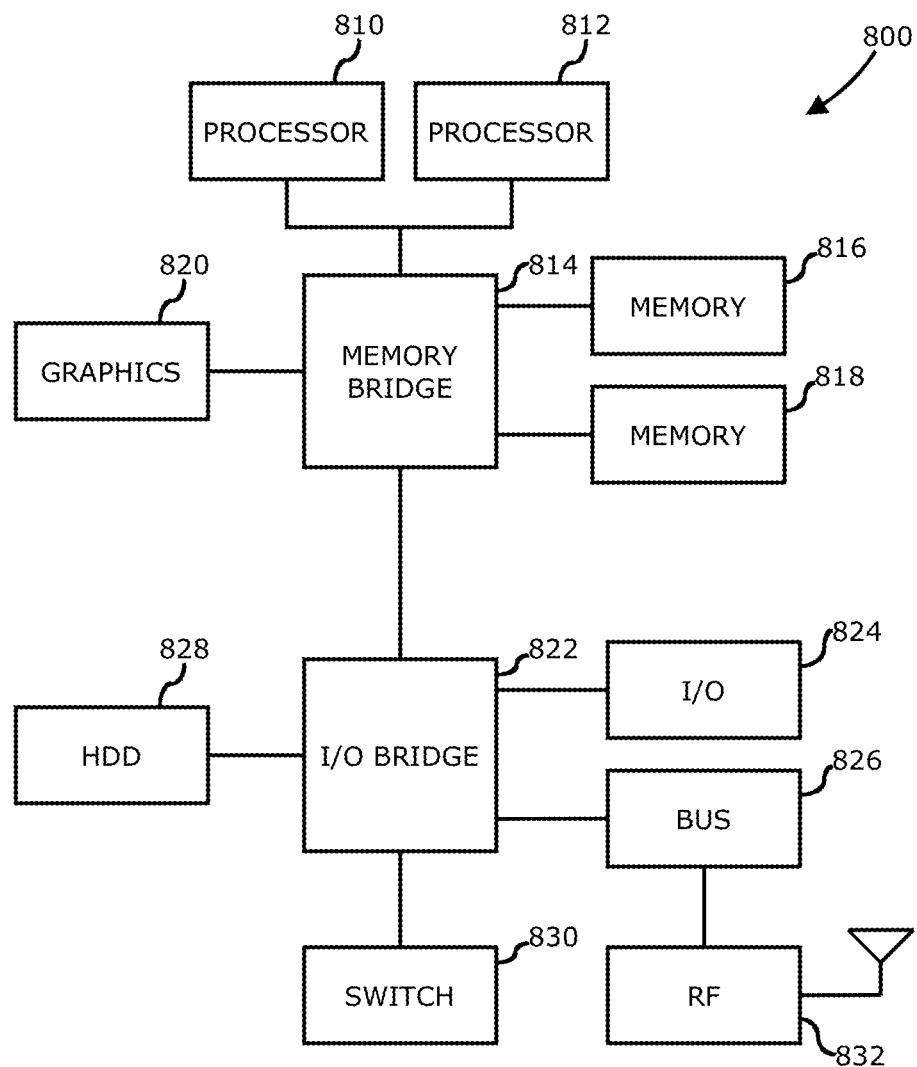
FIG. 8 is a block diagram of an information-handling system capable of implementing an adaptive H-ARQ system using outage capacity optimization in accordance with one or more embodiments.

Referring now to FIG. 8, a block diagram of an information-handling system capable of implementing an adaptive H-ARQ system using outage capacity optimization in accordance with one or more embodiments will be discussed. Information-handling system 800 of FIG. 8 may tangibly embody one or more of any of the network elements of network 200 as shown in and described with respect to FIG. 2, and furthermore may comprise transmitter 110 and/or receiver 114 of FIG. 1. For example, information-handling system 800 may represent the hardware of base station 214 and/or subscriber station 216, with greater or fewer components depending on the hardware specifications of the particular device or network element. Although information-handling system 800 represents one example of several types of computing platforms, inforrnation-handling system 800 may include more or fewer elements and/or different arrangements of elements than shown in FIG. 8, and the scope of the claimed subject matter is not limited in these respects.

Information-handling system 800 may comprise one or more processors such as processor 810 and or processor 812, which may comprise one or more processing cores in one or more embodiments. One or more of processor 810 and/or processor 812 may couple to one or more memories 816 and/or 818 via memory bridge 814, which may be disposed external to processors 810 and/or 812, or alternatively at least partially disposed within one or more of processors 810 and/or 812. Memory 816 and/or memory 818 may comprise various types of semiconductor-based memory, for example, volatile-type memory and/or non-volatile-type memory. Memory bridge 814 may couple to a graphics system 820 to drive a display device (not shown) coupled to information-handling system 800.

Information-handling system 800 may further comprise input/output (I/O) bridge 822 to couple to various types of I/O systems 824. I/O system 824 may comprise, for example, a universal serial bus (USB) type system, an IEEE 1394 type system, or the like, to couple one or more peripheral devices to information-handling system 800. Bus system 826 may comprise one or more bus systems such as a peripheral component interconnect (PCI) express type bus or the like, to connect one or more peripheral devices to information-handling system 800. A hard disk drive (HDD) controller system 828 may couple one or more hard disk drives or the like to information-handling system, for example Serial ATA type drives or the like, or alternatively a semiconductor-base drive comprising flash memory, phase change, and/or chalcogenide-type memory or the like. Switch 830 may be utilized to couple one or more switched devices to I/O bridge 822, for example, Gigabit Ethernet type devices or the like. In one or more embodiments, RF block 832 may comprise transmitter 110 and/or receiver 114 of FIG. 1, at least in part. Furthermore, at least some portion of transmitter 110 and/or receiver 114 may be implemented by processor 810, fur example, the digital functions of transmitter 110 and/or receiver 114, which may include processing of the baseband and/or quadrature signals, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to adaptive H-ARQ using outage capacity optimization and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
transmitting a data packet comprising a first number of bits encoded over a first number of symbols to a receiver;
receiving a negative acknowledgment message if the receiver did not successfully decode the data packet, the negative acknowledgment message comprising metric information for a channel over which the data packet was transmitted, the metric information comprising a sum channel capacity of one or more previous transmissions, a residual channel capacity for decoding the data packet, or a channel capacity per transmission, or combinations thereof; and
retransmitting one or more times the data packet encoded with a varying number of symbols to the receiver, the varying number of symbols being a function of the metric information received in the negative acknowledgment and being selected to optimize the retransmitting with respect to a target outage value.

2. A method according to claim 1, wherein the varying number of symbols is further based on a decreasing linear function of the metric information for one or more previous transmissions.

3. A method according to claim 1, wherein the metric information comprises a function of an estimated signal-to-noise ratio weighted by the varying number of symbols for one or more transmissions.

4. A method according to claim 1, wherein the varying number of symbols is further based on a function of an aggregated metric from one or more previous transmissions.

5. A method according to claim 1, wherein the retransmitting the data packet one or more times is terminated if a number of transmissions exceeds a selected number.

6. A method according to claim 1, wherein the varying number of symbols is further based on a function of the metric information of one or more previous transmissions regardless whether an acknowledgment or a negative acknowledgment message was received from the receiver.

7. A method, comprising:
receiving a data packet transmitted in a first transmission, the data packet comprising a first number of bits encoded over a first number of symbols;
sending a negative acknowledgment message if the data packet was not successfully decoded, the negative acknowledgment message comprising information relating to a channel capacity for a channel over which the data packet was received for the first transmission, the channel capacity comprising residual channel capacity for decoding the data packet, or channel capacity per retransmission, or a combination thereof; and
receiving the data packet in one or more subsequent transmissions, the data packet being encoded with a varying number of symbols as a function of the channel capacity for the channel and being selected to optimize the one or more subsequent transmissions to a target outage value.

8. A method according to claim 7, wherein the varying number of symbols is further based on as a decreasing linear function of the channel capacity of one or more previous transmissions.

9. A method according to claim 7, wherein the channel capacity comprises a function of an estimated signal-to-noise ratio weighted by the varying number of symbols for one or more transmissions.

10. A method according to claim 7, wherein the varying number of symbols is further based on a function of an aggregated channel capacity from one or more previous transmissions.

11. A method according to claim 7, wherein the one or more subsequent transmissions is terminated if a number of subsequent transmissions exceeds a selected number.

12. A method according to claim 7, wherein the varying number of symbols is further based on a function of the channel capacity of one or more previous transmissions regardless of whether an acknowledgment or a negative acknowledgment message is sent to the transmitter.

13. An information-handling system, comprising:
a baseband processor; and
a transceiver coupled to the baseband processor, wherein the baseband processor is configured to cause the transceiver to:
transmit a data packet comprising a first number of bits encoded over a first number of symbols to a receiver;
receive a negative acknowledgment message if the receiver did not successfully decode the data packet, the negative acknowledgment message comprising metric information for a channel over which the data packet was transmitted, the metric information comprising a channel capacity for one or more previous transmissions; and
retransmit the data packet encoded with a varying number of symbols to the receiver, the varying number of symbols being a function of the metric information for one or more previous transmissions and being selected to optimize the retransmitting to a target outage value.

14. An information-handling system according to claim 13, wherein the metric information further comprises a residual capacity for decoding the data packet, or a capacity per retransmission, or a combination thereof 15. An information-handling system according to claim 13, wherein the metric information further comprises a function of an estimated signal-to-noise ratio weighted by the varying number of symbols for one or more transmissions.

16. An information-handling system according to claim 13, wherein the varying number of symbols is further based on a function of an aggregated channel capacity for one or more previous transmissions.

17. An information-handling system according to claim 13, wherein the baseband processor is further configured to terminate a subsequent transmission if a number of transmissions exceeds a selected number.

18. An information-handling system according to claim 13, wherein the varying number of symbols is further based on a function of the metric information of one or more previous transmissions or retransmissions regardless of whether an acknowledgment or a negative acknowledgment message was received from the receiver.

* * * * *